United States Patent Office 3,137,646
Patented June 16, 1964

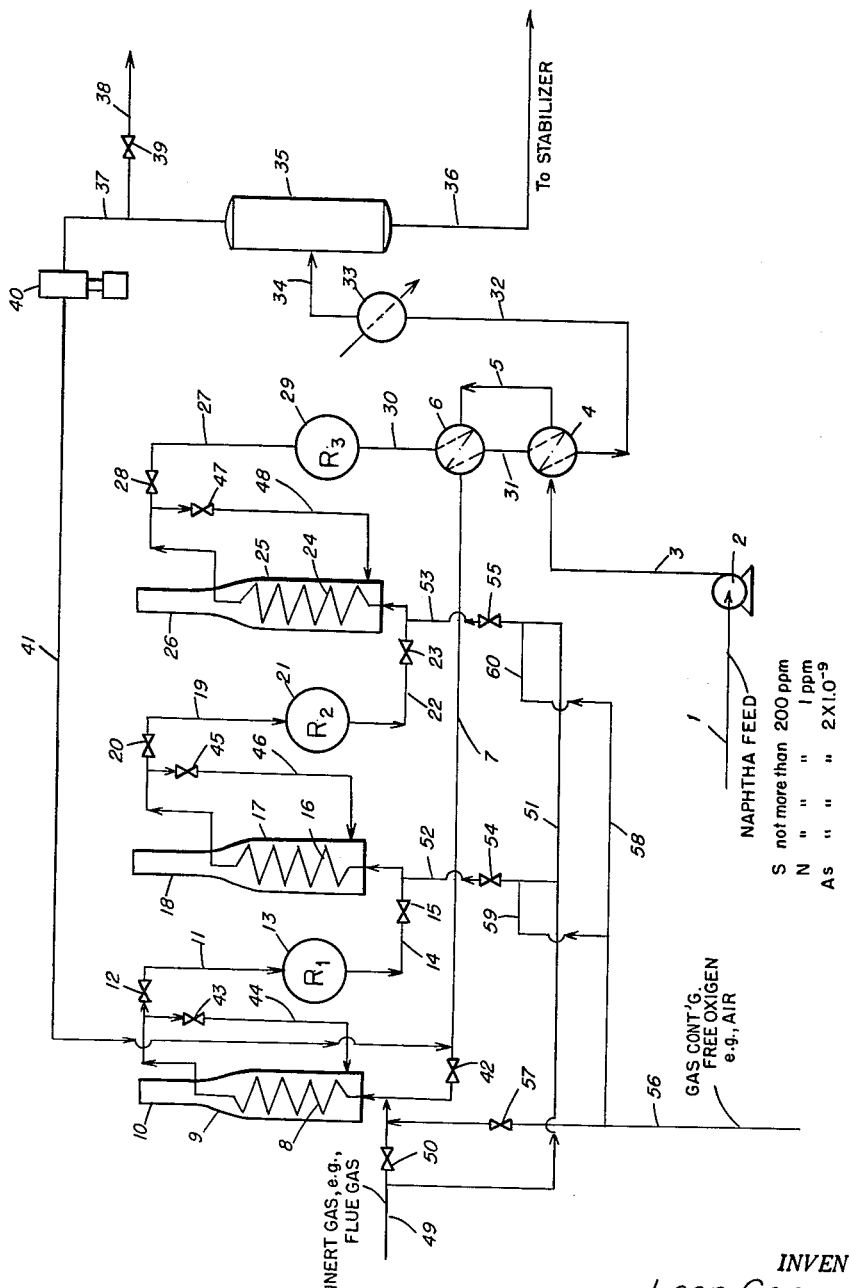

3,137,646
METHOD OF PREVENTING SULFUR DIOXIDE DETERIORATION OF PLATINUM-GROUP METAL REFORMING CATALYST
Leon M. Capsuto, Woodbury, N.J., assignor to Socony Mobil Oil Company, Inc., a corporation of New York
Filed Nov. 29, 1961, Ser. No. 156,561
7 Claims. (Cl. 208—65)

The present invention relates to the regeneration of particle-form solid platinum-group metal reforming catalyst and, more particularly, to preventing deterioration of particle-form solid platinum-group metal reforming catalyst resulting from contact of said catalysts with sulfur dioxide during regeneration by combustion in free-oxygen containing gas of carbonaceous material deposited during an on-stream period.

It is well known that all petroleum naphthas contain sulfur. The corrosive effect of hydrogen sulfide on ferrous alloys has also been recognized. Consequently, when designing a reforming unit the sulfur content of the feed to be treated is an important factor in determining the steel to be used in fabrication. Initially, it was solely a question whether it was economically advantageous to fabricate the piping, heaters, and reformers from stainless steel or to treat the reformer feed to remove the sulfur and fabricate the piping, heaters, and reactors from low alloy steel. A compromise was effected and when the sulphur content of the naphtha to be treated was less than 200 p.p.m. (parts per million) the naphtha was not pretreated and high alloy steel was used for the reforming reactors, heaters and piping. On the other hand, when the sulfur content of the naphtha to be treated exceeded 200 p.p.m. provision was made for hydrodesulfurizing the naphtha feed prior to reforming.

Subsequently, it was recognized that, from the aspect of the on-stream time of the reforming unit between regenerations, the nitrogen content of the feed was far more important. As a consequence, naphthas having a nitrogen content in excess of 1 p.p.m. now are either diluted with another naphtha to reduce the nitrogen content of the mixture to not more than 1 p.p.m. or the naphtha is hydrodenitrogenated. Presently, substantially all reformer feeds are hydrodecontaminated by contact in the presence of hydrogen with a hydrogenating catalyst having hydrodesulfurizing and hydrodenitrogenizing capabilities. Nevertheless, the tubes of at least the heater up-stream of the reforming reactor are coated with a sulfide film which, when inert gas containing free oxygen flows therethrough during regeneration of the platinum-group metal reforming catalyst, is partly converted to iron oxide and sulfur dioxide and partly blown through the piping and deposited on the top and through the upper portion of the static catalyst bed in the reactor down-stream of the heater.

To overcome the difficulties attendant upon the deposition of sulfide scale on and in the upper portion of a static bed of platinum-group metal catalyst Bergstrom in U.S. Patent No. 2,884,372 submerges foraminous baskets in the upper portion of the static bed of platinum catalyst.

Engel in U.S. Patent No. 2,792,337 recommends that the oxygen-containing gas be introduced into the catalyst bed without prior contact with parts of the reactor and feed inlet line and to pass part of the gas back through the forepart of the catalyst bed and the feed inlet line of the reactor and the remainder forward through the catalyst bed without recycling any part of the gas through the catalyst bed.

Hengstebeck in U.S. Patent No. 2,873,176 discloses that difficulties can be avoided by not exposing the sulfide scale in the heater tubes to free oxygen. Hengstebeck teaches to pass inert carrier gas through the heater and to inject sufficient oxygen to produce combustion of the carbonaceous material, usually designated as coke, into the carrier gas between the heater and the reactor.

Thomson in U.S. Patent No. 2,923,679 recommends that the heated oxygen-containing regeneration gases flow through the reforming unit in a direction which is the reverse of the flow of naphtha and hydrogen-containing gas.

The present invention provides another solution to this problem which for simplicity of operation appeals to operators of reforming units and for economic reasons is very attractive. Whether the naphtha is hydrodecontaminated prior to reforming or contains so little sulfur and nitrogen to justify no hydrodecontamination, the method of avoiding or of substantially preventing the deleterious effect of sulfur dioxide upon platinum-group metal reforming catalyst is useful. Experience has shown that even when low-sulfur, low-nitrogen naphthas are reformed without prior hydrodecontamination in a reforming unit having a plurality of reactors little hydrogen-sulfide corrosion of the heater tubes occurs in the heaters subsequent to the first reactor. Accordingly, the present invention provides for converting the sulfide scale in at least the heater up-stream of the first of a plurality of reforming reactors to sulfur dioxide and iron oxide and venting the gases to either the inert gas generator stack, to the refinery flare, or to a unit in which the sulfur dioxide can be absorbed or converted to a useful material. The choice of the means of disposing of the sulfur dioxide-containing gases is dependent upon local anti-pollution ordinances and economic considerations.

A method of regenerating particle-form solid platinum-group metal reforming catalyst while preventing sulfur dioxide deterioration of the catalyst is illustrated in the drawing. The drawing illustrates in a schematic manner the flow of naphtha feed and hydrogen-containing recycle gas through a reforming unit while on-stream and the flow of inert carrier gas and inert carrier gas containing free oxygen through the unit while off-stream and while particle-form solid platinum-group metal reforming catalyst is being regenerated.

The reforming unit comprises first or head heater 9, head reactor 13, intermediate heater 17, intermediate reactor 21, tail heater 25, tail reactor 29, indirect heat exchangers 4 and 6, cooler 33, liquid-gas separator 35, and recycle gas compressor 40 and necessary piping for the naphtha and hydrogen-containing recycle gas to flow in series from the head heater through the intermediate heaters and reactors, the tail heater, the tail reactor, the heat exchangers, the cooler, and the liquid-gas separator. From the liquid-gas separator 35 the hydrogen-containing reformer gas flows through conduit 37 to recycle gas compressor 40. A portion of the reformer gas in excess of that required to maintain the selected hydrogen-to-naphtha mol ratio in the reactors is vented through conduit 38 under control of valve 39 during the on-stream period.

When the required octane rating of the $C_5$ and heavier reformate can no longer be maintained at the maximum reactor vapor inlet temperature permitted, usually in the range of about 980° to about 1050° F., it is necessary to regenerate the catalyst. This brings the on-stream period to an end and initiates the off-stream or regeneration period.

In accordance with the method of the present invention the fuel supply to heaters 9, 17, and 25 is shut-off, valve 42 in naphtha conduit 7 is closed, and the unit evacuated to about 25 inches of mercury (vacuum). Inert gas, for example, nitrogen or flue gas substantially devoid of free-oxygen is pumped through the heaters and reactors at a pressure of about 30 to about 100 p.s.i.g. and vented through conduit 38 until the vented gases are substantially devoid of hydrogen and hydrocarbons. This concludes the purge of the unit. The unit is now ready to be purged of sulfur in accordance with the method of the present invention.

Since generally only the tubes 8 of the head heater 9 have a deposit of iron sulfide in sufficient amount to result in the production of sulfur dioxide in quantities sufficient to have a deleterious effect upon the platinum-group metal reforming catalyst, usually it is sufficient to purge only the tubes of the head heater. However, the tubes of the other heaters in the unit, e.g., heaters 17 and 25 can also be purged of sulfur when desirable, necessary or for certainty that the platinum-group metal reforming catalyst is not exposed to substantial quantities of sulfur dioxide.

Accordingly, the unit having been purged of hydrogen and hydrocarbons, the temperature of the tubes in the heaters being not less than about 600° F. (to avoid producing stresses therein) valve 12 and optionally valves 20 and 28 in the transfer lines 11, 19, and 27 respectively between the head heater 9 and head reactor 13, between intermediate heater 17 and intermediate reactor 21, and between tail heater 25 and tail reactor 29 are closed. Valves 43, 45, and 47 in purge vent conduits 44, 46, and 48 respectively connecting transfer lines 11, 19, and 27 with the fireboxes of heaters 9, 17, and 25 are opened. Valves 15 and 23 in transfer lines 14 and 22 are closed and the unit is prepared for the sulfur purge.

For the purpose of illustration of the situation when the sulfur deposited in tubes 16 and 24 of heaters 17 and 25 respectively is sufficient to require a sulfur purge, a sulfur purge of the tubes in all heaters will be described.

Accordingly, with valves 42, 12, 15, 20, 23, and 28 closed and valves 43, 45, 47, 50, 54, and 55 open, inert gas such as flue gas flows at a pressure in the range of about 30 to about 200 p.s.i.g., preferably about 30 to about 100 p.s.i.g. from a source not shown through conduit 49 to conduit 7, through conduits 51 and 52 to conduit 14, and through conduits 51 and 53 to conduit 22.

Considering the sulfur purge of the tubes 8 of heater 9 first, although it is to be understood that the sulfur purge of tubes 16 in heater 17 and of tubes 24 in heater 25 takes place contemporaneously or successively, the inert gas flows from conduit 49 under control of valve 50 to conduit 7 and thence to coil 8 in heater 9. From coil 8 the inert gas flows through transfer line 11 to sulfur purge gas conduit 44 and thence to the firebox of heater 9. From the firebox of heater 9 the inert gas flows admixed with the products of combustion of the fuel through shaft 10 to the heater stack (not shown).

When the temperature of the tubes is in the range of about 600° to about 1000° F. air or other gas containing free oxygen flowing through conduit 56 (valve 57 open) is admixed with the inert gas flowing through conduit 49 in amount sufficient to initiate oxidation of the iron sulfide deposit. The concentration of free oxygen in the inert gas flowing through conduit 49 is increased slowly to ensure that the temperature of the gases flowing from coil 8 does not exceed about 1000° F. A maximum concentration of about 3 percent by volume of oxygen in the inert gas generally is sufficient to complete the oxidation of the iron sulfide and to complete the sulfur purge. During the oxidation of the iron sulfide the gases containing sulfur dioxide flow from coil 8 through transfer line 11 to purge gas line 44 to the firebox of heater 9. In the firebox the sulfur purge gases are mixed with the products of combustion of the heater fuel which usually contain sulfur dioxide. The products of combustion and the admixed sulfur purge gases flow from heater 9 through shaft 10 to the heater stack. Combustion of the sulfide deposit in coil 8 is continued until the presence of sulfur dioxide in the gases flowing through conduit 44 cannot be detected when the sulfur dioxide therein is absorbed and oxidized in a 3 percent hydrogen peroxide solution, and is titrated acidemetrically. (This method is used to determine simultaneously sulfur dioxide and hydrogen sulfide in catalyst regeneration gas mixtures in the concentration range of 0.001 to 0.2 percent. Other acid gases, except carbon dioxide, interfere in the basic procedure for sulfur dioxide but the sulfate ion can be determined by a conventional method, e.g., turbidimetric or gravimetric.)

In a similar manner the coils in heaters 17 and 25 are purged of sulfur when necessary or desirable. Thus, inert gas flows at a pressure of at least 30 p.s.i.g. from conduit 49 through conduits 51 and 52 and thence through conduit 14 to coil 16 in heater 17. From heater 17 the inert gas flows through transfer line 19 to sulfur purge gas conduit 46 and the firebox of heater 17. In the firebox of heater 17 the sulfur purge gases mix with the products of the combustion of the feed supplied to heater 17. The products of combustion and sulfur purge gases flow through shaft 18 to the heater stack (not shown). When the temperature of the inert gas in coil 16 reaches a temperature at which iron sulfide is decomposed to iron oxide and sulfur dioxide by gas containing free oxygen and preferably when the temperature of the inert gas flowing through coil 16 reaches about 600° F., air flowing from a source not shown through conduits 56, 58, and 59 is admixed therewith in concentrations up to about 3 percent by volume whilst maintaining a temperature not in excess of 1000° F. in coil 16. When the presence of sulfur dioxide can no longer be detected in the sulfur purge gases flowing from coil 16 by means of the hereinbefore-described test or other suitable means the sulfur purge is complete.

In a like manner contemporaneous with the sulfur purge of the coils in heaters 9 and 17 or thereafter when necessary or desirable coil 24 in heater 25 is also purged of sulfur. That is to say, inert gas flows from conduit 49 through conduits 51 and 53 to conduit 22 and thence to coil 24 in heater 25. From coil 24 the inert gas flows through conduit 27 to conduit 48 to the firebox of heater 25. In the firebox the inert gas mixes with the products of combustion of the fuel supplied to heater 25 and flows therewith to shaft 26 and the heater stack (not shown). When the temperature of the inert gas reaches a temperature at which free oxygen converts iron sulfide to iron oxide and sulfur dioxide and preferably at a temperature of at least 600° F. but not higher than about 1000° F. air flowing from conduit 56 through conduits 58 and 60 is admixed gradually with the inert gas to raise the concentration of free oxygen in the inert gas incrementally from zero to about 3 percent by volume while maintaining a temperature in the range of about 600° to about 1000° F. in coil 24. When sulfur dioxide can no longer be detected by any suitable test in the gas flowing from coil 24 to the firebox of heater 25 the sulfur purge is completed. When the inert gas flowing through the coils in heaters 9, 17, and 25 no longer contains sulfur dioxide in concentration detectable by the hereinbefore described test or other suitable test, the regeneration of the coked platinum-group metal reforming catalyst is initiated.

The preferred method of regenerating the platinum-group metal reforming catalyst is described hereinafter. However, any suitable sequence of operations in which the free-oxygen containing regenerating gas flows through the heaters is within the scope of the present invention. The preferred method of regenerating a plurality of static beds of particle-form solid platinum-group metal reforming catalyst is as follows:

(1) Evacuate the reformer recycle system to 25" Hg (vacuum), fill with nitrogen to 5.0 p.s.i.g., and circulate with recycle compressor for 30 minutes. Sweep system to atmosphere through all available vents and drains.

(2) Repeat step No. 1 until hydrogen content of system is below 2.0 vol. percent (SVM 373–53 method, or equivalent).

(3) When hydrogen content of system is below 2.0 vol. percent pressure to 30 p.s.i.g. with nitrogen.

First stage of regeneration or "light burn":

(1) With the recycle gas compressor operating, refire heaters and bring reactor inlet temperature of first reaction up to 550° F. Hold for approximately two hours or until the upper part of the reactor is essentially at 550° F.

(2) Add air to the inlet of the No. 1 reactor at a rate not to exceed 21.0 s.c.f.m. per ms.c.f.m. nitrogen recycle until an amount of air equal to 3.5% (three and one-half percent) of the volumetric capacity of the unit has been added.

(3) Discontinue air addition until initiation of the burning has definitely been established (by oxygen disappearance or by temperature rise at the top of the bed). In the event that burning has not started it may be necessary to raise inlet air temperatures in increments of 25° until burning starts.

(4) After it is known that burning has started, resume continuous air addition at the 21.0 s.c.f.m. per ms.c.f.m. nitrogen recycle rate. The burning wave will start in the top and burn downward through the bed. Temperature of the burning peak should be maintained at approximately 650° F. This may be accomplished by variation of the air inlet rate.

(a) If temperature peaks during this stage exceed 675°, decrease air rate.

(b) If burning front temperature peaks remain consistently below 650, air rate can be increased up to 0.7 vol. percent oxygen in the reactor inlet.

(5) Bleed excess gas from the system to hold the maximum system pressure which will permit air to be introduced into the unit.

(6) When the burning front has passed through No. 1 reactor, heat the inlet of No. 2 reactor to 550° F. and repeat Steps 1–5. When the burning front has passed through No. 2 reactor switch the air injection point to the inlet of No. 3 reactor.

(7) A continuous check of the oxygen content at the outlet of No. 3 reactor should be made during the regeneration period. If oxygen percentages above 0.4 volume percent are measured at this point, air injection should be discontinued.

(8) Drain accumulated water which is formed during regeneration, from the bottom of the H.P. separator and at any other low points in the piping. Measure quantity of water drawn.

(9) If only the "light burn" is to be given to the catalyst prior to a shutdown for unit maintenance, disregard Item 10 which follows. Shut off fuel gas to heaters, cool unit to ambient temperatures, shut down compressor, and depressure. The unit is now ready for opening.

(10) If a complete catalyst regeneration is necessary, shut off fuel gas to the heaters, shut down compressors, depressure and evacuate the system.

Final stage "Main Burn" of regeneration:

(1) After evacuation of the reformer (see Item 10 above) repressure the system with nitrogen to 30 p.s.i.g. Start the recycle gas compressor and fire the heaters. Bring first reactor inlet temperature up to 750° F.

(2) Add dry air to the inlet of No. 1 reactor at a rate not to exceed 21.0 s.c.f.m. per ms.c.f.m. nitrogen recycle until an amount of air equal to 3.5 volume percent (three and one-half volume percent) of the volumetric capacity of the unit has been added.

(3) Discontinue air addition until initiation of burning has definitely been established (by oxygen disappearance or by temperature rise at the top of the bed). In the event that burning has not started, it may be necessary to raise inlet air temperatures in increments of 25° F. until burning starts.

(4) After it is known that the carbon is burning, resume continuous air addition at the 21.0 s.c.f.m. per ms.c.f.m. nitrogen recycle rate. Temperature of the burning peak should be maintained at approximately 850° F. This may be accomplished by variation of the air inlet rate.

(a) If temperature peaks exceed 850° F., decrease air rate;

(b) If burning fron temperature peaks remain consistently below 825° F., air rates should be increased up to but not to exceed 0.7 volume percent oxygen in the reactor inlet.

(5) Bleed excess gas from the system to hold the maximum system pressure which will permit air to be introduced into the unit.

(6) When the burning front has passed through No. 1 reactor, heat up No. 2 reactor. When the burning front has passed through No. 2 reactor, heat up No. 3 reactor.

(7) Continuously check oxygen content of the effluent gas from the No. 3 reactor. If oxygen above 0.4 volume percent is measured at this point, discontinue air injection.

(8) Check for and drain any water accumulated in the H.P. separator and other low points in the system.

(9) As soon as regeneration is complete (oxygen breakthrough No. 3 reactor) put out the fires in the first and second reheaters (Nos. 2 and 3 reactor heaters). Reduce the naphtha-recycle gas preheater outlet temperature at 100° F./hr. until 500° F. is reached. Then shut off fuel gas to this heater.

(10) Continue to circulate through the system until the reactors are at ambient temperature (near 100° F.). Then shut down the recycle gas compressor.

(11) The regeneration is now complete and the unit can be put back on stream in any suitable manner.

Those skilled in the art will recognize that a description of an improvement in the method of regenerating static beds of particle-form solid platinum-group metal reforming catalyst has been provided in the foregoing discussion of the present invention. Accordingly, the present invention provides a method of regenerating the aforesaid class of reforming catalyst and particularly platinum-group metal reforming catalyst comprising about 0.35 to about 0.6 percent by weight of platinum on a refractory oxide support such as alumina in a reforming unit comprising at least a head heater, a head reactor, a tail heater, and a tail reactor wherein the aforesaid particle-form solid platinum-group metal reforming catalyst is distributed as a static bed thereof in each reactor, wherein the inner surfaces of the reactant heater tubes in at least the aforesaid head heater have a deposit comprising iron sulfide, and wherein after purging hydrogen and hydrocarbon from at least the aforesaid heater and transfer line intermediate to said head heater and to said head reactor, inert gas is circulated through said reactant heater tubes in the aforesaid head heater, said transfer line, a sulfur purge conduit intermediate to said transfer line and to the firebox of said head heater, admixed with products of combustion of fuel supplied to said head heater in said firebox thereof, and flows with said admixed products of combustion to the stack of said heater until the temperature of the inert gas in said reactant heater tubes is a temperature at which iron sulfide in the presence of low concentrations of free oxygen not greater than about 3 percent by volume decomposes into sulfur dioxide and iron oxide and preferably a temperature in the range of about 600° to about 700° F. Thereafter, free oxygen is admixed incrementally with the aforesaid circulating inert gas up to a concentration of about 3 percent by volume while maintaining a temperature in the range of about 600° to about 1000° F. in the afosesaid heater tubes. The mixture of inert gas and oxygen is passed through the aforesaid heater tubes until sulfur dioxide is not detected in the gases entering the firebox of the aforesaid heater. The sulfur purge is then complete and regeneration of the platinum-group metal reforming catalyst is initiated. When the inner surfaces of the reactant heater tubes in the other heaters in the unit have a deposit of iron sulfide the other heaters are subjected to the aforesaid sulfur purge contemporaneously or successively.

I claim:

1. In the reforming of a naphtha fraction in the presence of particle-form solid platinum-group metal reforming catalyst wherein the aforesaid platinum-group metal reforming catalyst is distributed in a plurality of reaction zones comprising at least a head reaction zone and a tail reaction zone, wherein a head reactant heater having reactant tubes therein is up-stream of said head reactor, wherein a tail reactant heater having reactant tubes therein is up-stream of said tail reactor, wherein the naphtha fraction to be reformed is heated to at least 800° F. in said head heater and the heated naptha passed via a transfer line to said head reactor through a bed of said platinum-group metal catalyst in said head reactor, wherein the effluent of said head reactor flows through the reactant heater tubes in said tail heater to said tail reactor and through a bed of said platinum-group metal catalyst in said tail reactor, wherein the effluent of said tail reactor flows to a liquid-gas separator in which hydrogen and light hydrocarbons are separated from C$_4$ and heavier hydrocarbons, wherein carbonaceous material is deposited on said catalyst deactivating said catalyst, wherein said catalyst is reactivated by combustion in a flowing stream of inert gas containing free oxygen heated in said head and tail heaters, wherein iron sulfide is deposited on the inner periphery of the reactant heater tubes of at least said head heater and wherein said heaters, reactors, and intervening piping are purged of hydrogen and hydrocarbons before reactivating said catalyst, the improvement which comprises subjecting the reactant heater tubes of at least said head heater to a sulfur purge comprising passing a sulfur purge mixture, comprising inert gas containing free oxygen through said reactant heater tubes to produce gas containing sulfur dioxide from said iron sulfide while regulating the oxygen concentration of said sulfur purge mixture to maintain a temperature not exceeding about 1000° F. in said reactant heater tubes, venting said inert gas without contacting the aforesaid platinum catalyst, continuing to pass said sulfur purge mixture through said reactant heater tubes and to vent gas containing sulfur dioxide until sulfur dioxide is not detected in said vented gas, and then burning said carbonaceous material deposited on said catalyst.

2. The method of preventing substantial sulfur dioxide deterioration of platinum-group metal reforming catalyst set forth in claim 1 wherein the gas containing sulfur dioxide is vented to the stack of said heater.

3. The method of preventing substantial sulfur dioxide deterioration of platinum-group metal reforming catalyst set forth in claim 1, wherein the gas containing sulfur dioxide is contacted with alkaline material.

4. The method of preventing substntial sulfur dioxide deterioration of platinum-group metal reforming catalyst set forth in claim 1 wherein said tail heater is subjected to said sulfur purge and the gas containing sulfur dioxide is vented to the stack of said tail heater.

5. The method of preventing substantial sulfur dioxide deterioration of platinum-group metal reforming catalyst as set forth in claim 1 wherein said head heater and said tail heater are subjected to said sulfur purge contemporaneously.

6. The method of preventing substantial sulfur dioxide deterioration of platinum-group metal reforming catalyst as set forth in claim 1 wherein said head heater and said tail heater are subjected to said sulfur purge successively.

7. The method of preventing substantial sulfur dioxide deterioration of platinum-group metal reforming catalyst set forth in claim 1 wherein inert gas is circulated through said reactant heater tubes in said heater and heated until the temperature of the aforesaid heater tubes is in the range of about 600° to about 1,000° F., wherein gas containing free oxygen is admixed with said circulating inert gas, wherein the concentration of oxygen in said circulating inert gas is increased incrementally to not more than three percent by volume to maintain a temperature in the aforesaid heater tubes in the range of about 600° to about 1,000° F.

References Cited in the file of this patent
UNITED STATES PATENTS

| | | |
|---|---|---|
| 2,766,179 | Fenske et al. | Oct. 9, 1956 |
| 2,873,176 | Hengstebeck | Feb. 10, 1956 |
| 2,792,337 | Engel | May 14, 1957 |
| 2,980,631 | Craig et al. | Apr. 18, 1961 |